F. RAUCHWETTER.
CALCULATING MACHINE.
APPLICATION FILED AUG. 13, 1910.
996,523.
Patented June 27, 1911.
10 SHEETS—SHEET 1.
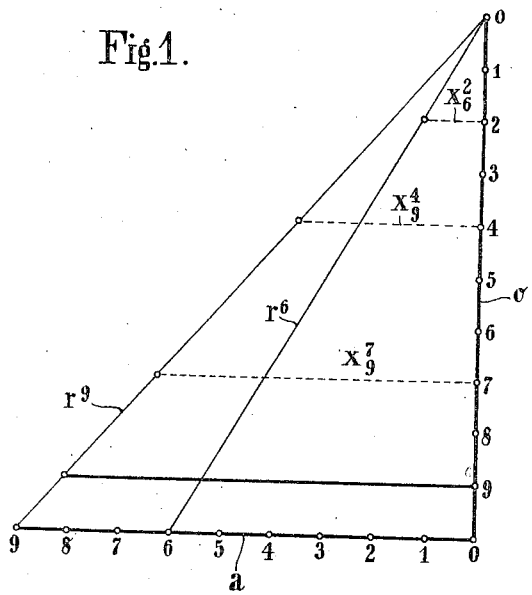
Fig. 1.
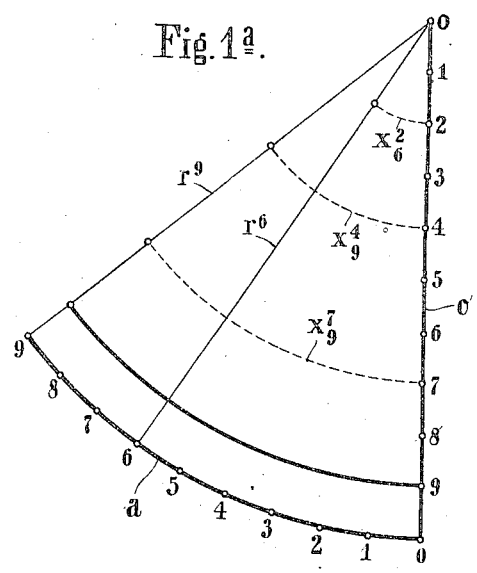
Fig. 1ª.
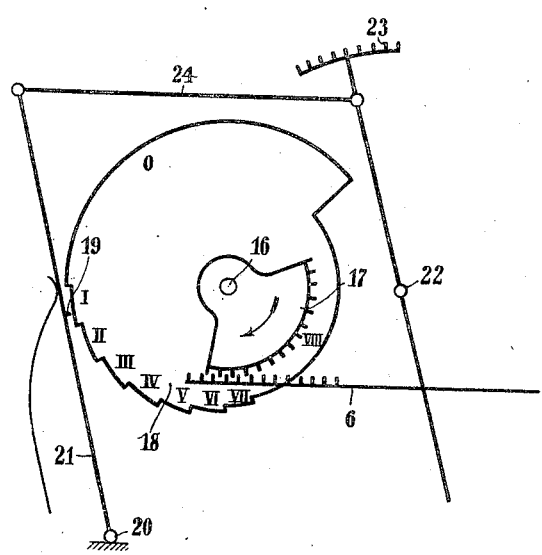
Fig. 3.
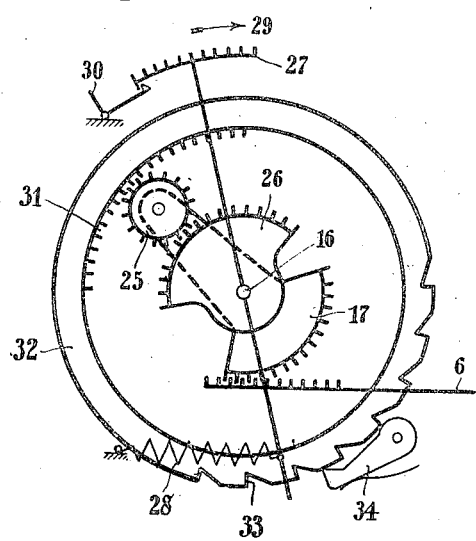
Fig. 4.
Witnesses:
Inventor:
Franz Rauchwetter
by B. Singer
Atty.

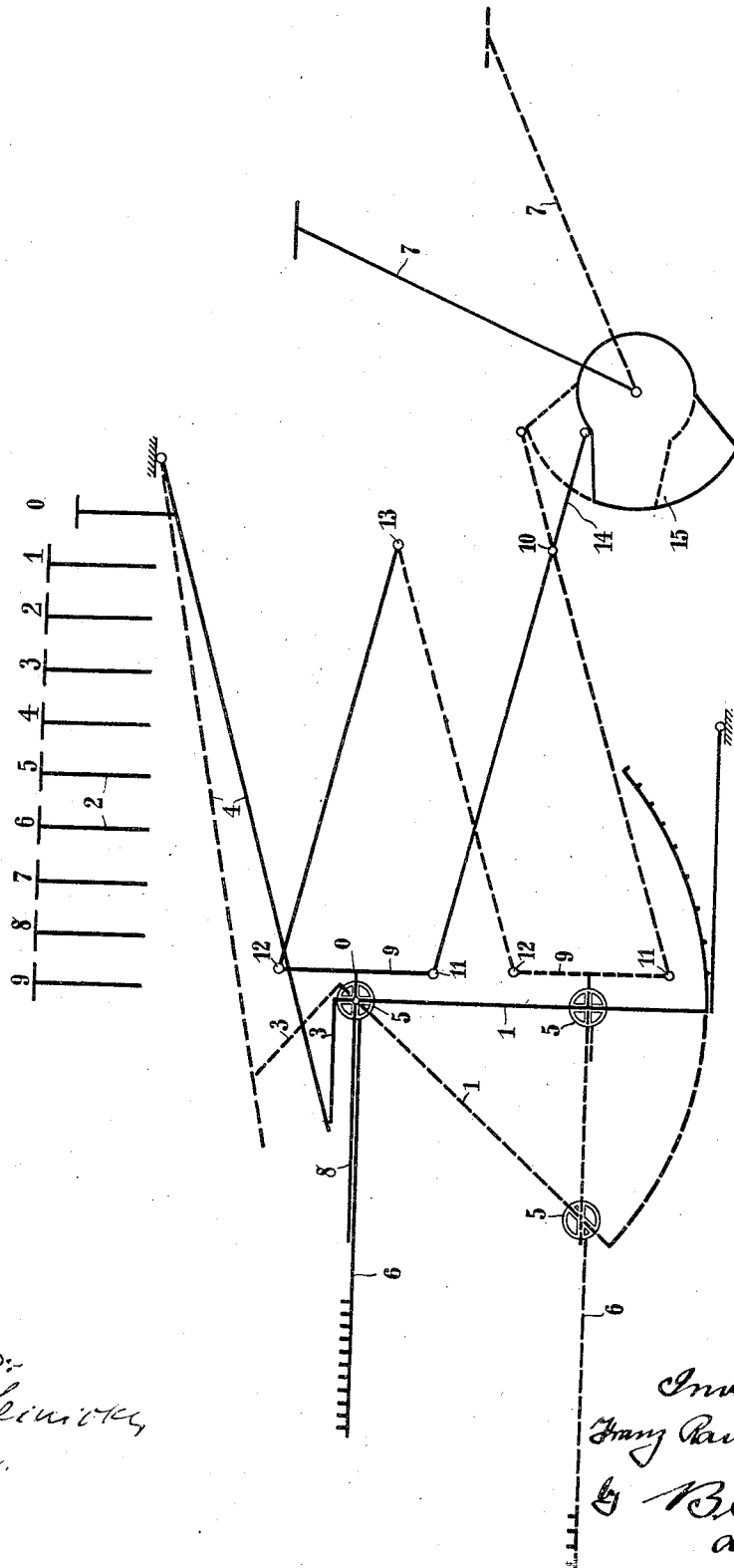

F. RAUCHWETTER.
CALCULATING MACHINE.
APPLICATION FILED AUG. 13, 1910.

996,523.

Patented June 27, 1911.
10 SHEETS—SHEET 3.

Witnesses:
Geo. C. Heinitz
H. Kasper

Inventor:
Franz Rauchwetter
by B. Singer
atty.

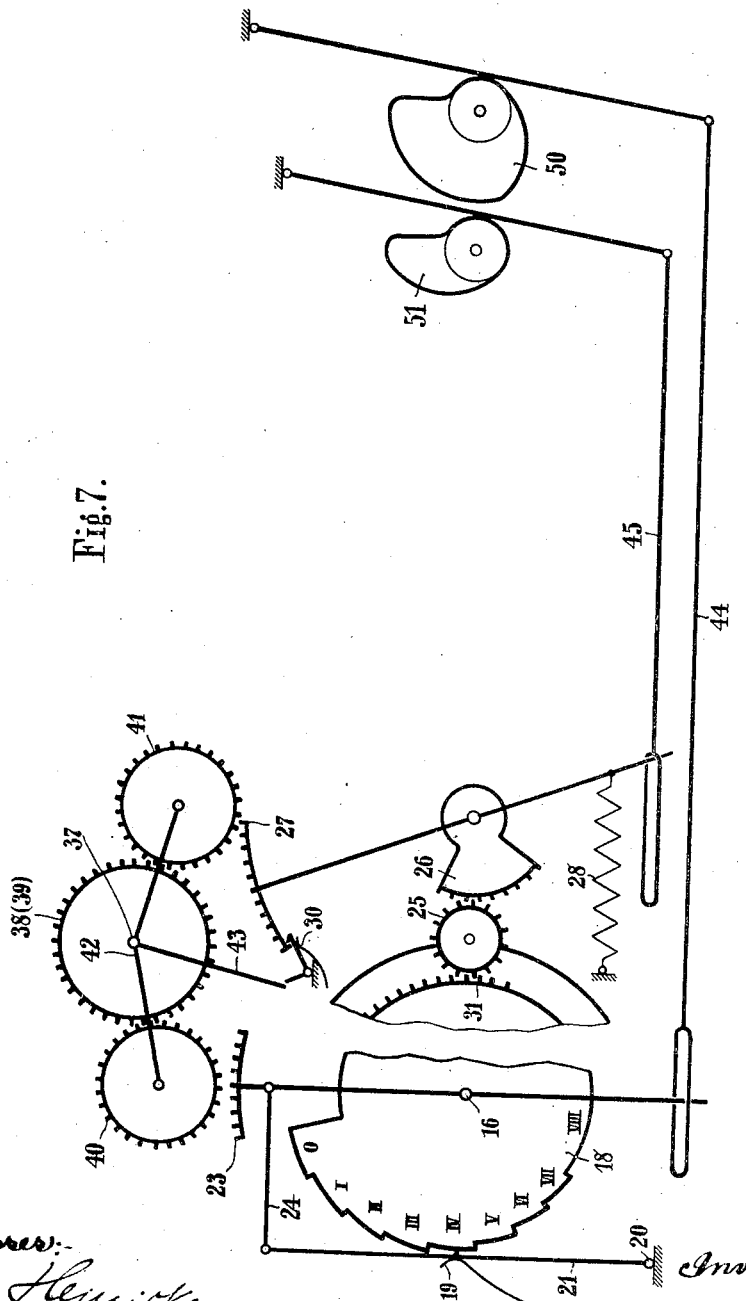

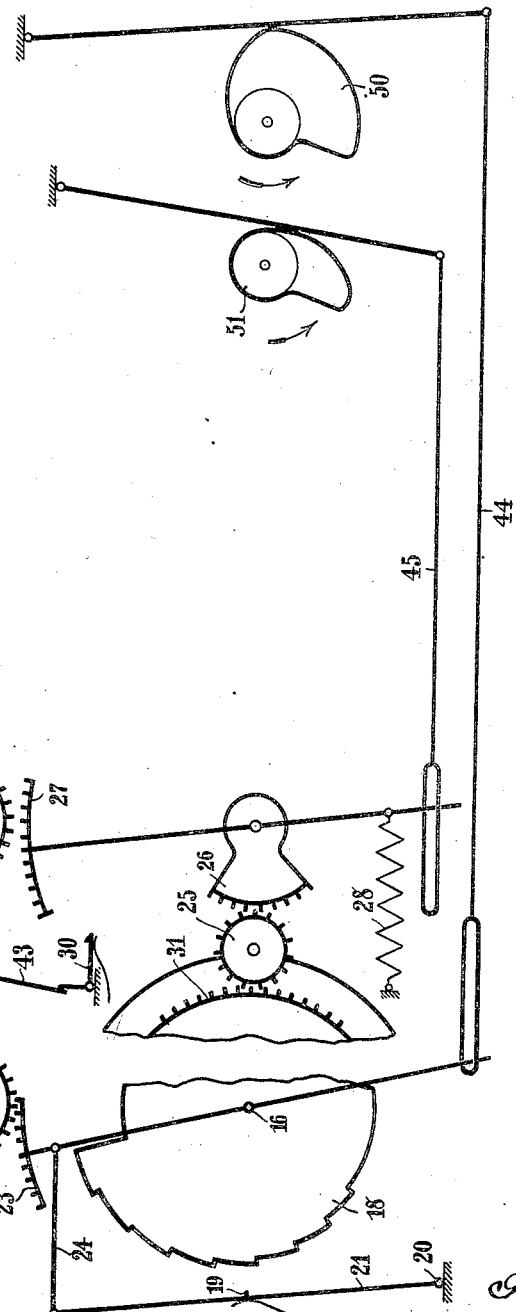

F. RAUCHWETTER.
CALCULATING MACHINE.
APPLICATION FILED AUG. 13, 1910.

996,523.

Patented June 27, 1911.
10 SHEETS—SHEET 6.

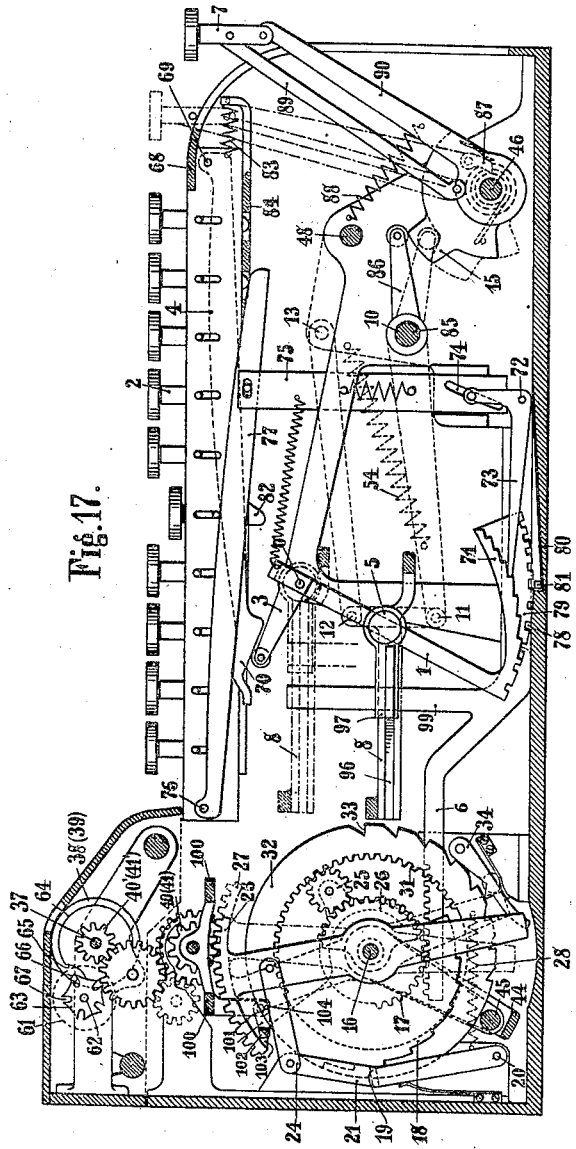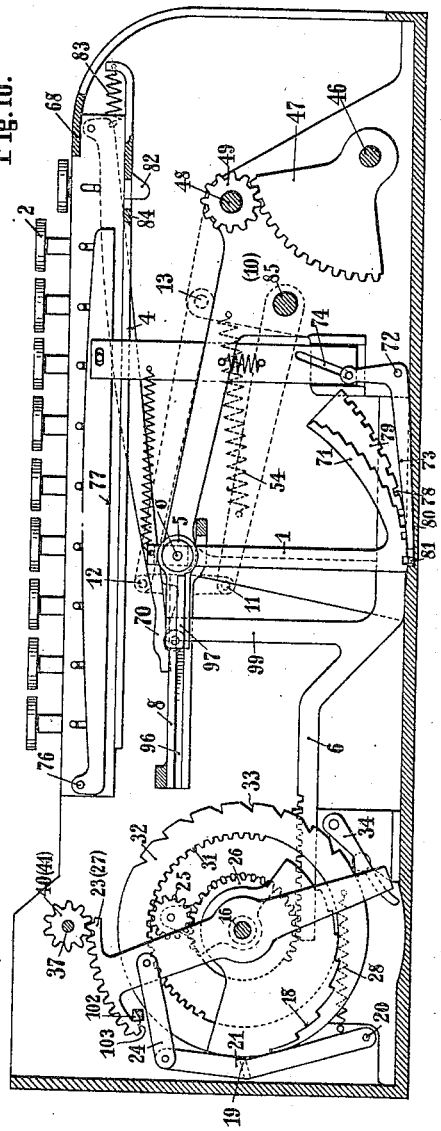

F. RAUCHWETTER.
CALCULATING MACHINE.
APPLICATION FILED AUG. 13, 1910.

996,523.

Patented June 27, 1911.
10 SHEETS—SHEET 8.

Witnesses:
Geo. C. Hinicke
F. Kasper

Inventor:
Franz Rauchwetter
by B. Singer
atty.

F. RAUCHWETTER.
CALCULATING MACHINE.
APPLICATION FILED AUG. 13, 1910.

996,523.

Patented June 27, 1911.
10 SHEETS—SHEET 9.

F. RAUCHWETTER.
CALCULATING MACHINE.
APPLICATION FILED AUG. 13, 1910.
996,523.
Patented June 27, 1911.
10 SHEETS—SHEET 10.
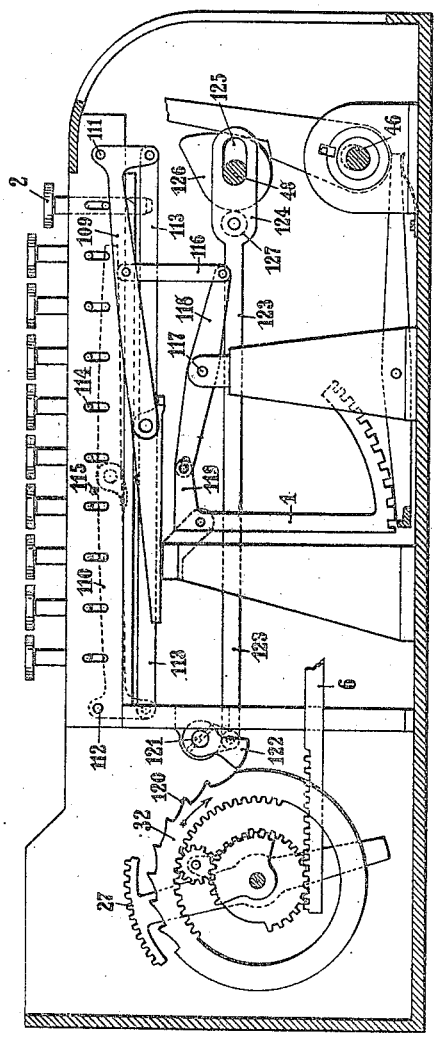
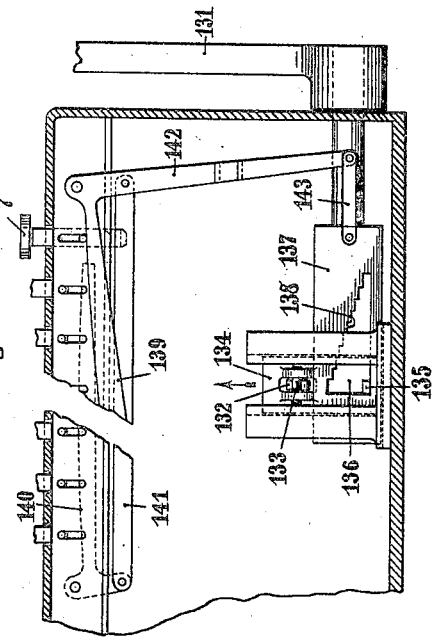
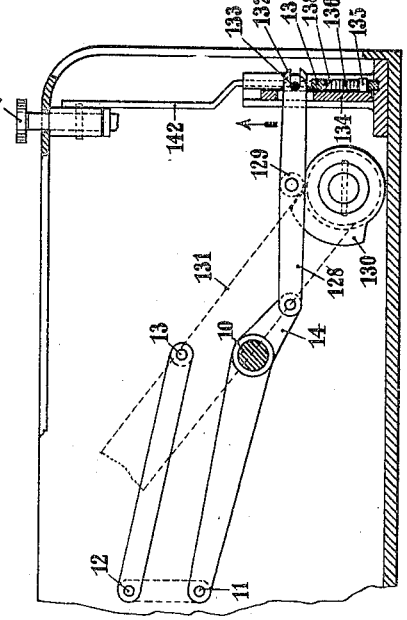

UNITED STATES PATENT OFFICE.

FRANZ RAUCHWETTER, OF FRIEDENAU, NEAR BERLIN, GERMANY.

CALCULATING-MACHINE.

996,523.

Specification of Letters Patent. Patented June 27, 1911.

Application filed August 13, 1910. Serial No. 577,046.

*To all whom it may concern:*

Be it known that I, FRANZ RAUCHWETTER, a subject of the German Emperor, residing at 2 Schwalbacherstrasse, Friedenau, near Berlin, Germany, have invented certain new and useful Improvements in Calculating-Machines; and I do hereby declare the following to be a full, clear, and exact description of the invention, such as will enable others skilled in the art to which it appertains to make and use the same.

The present machine belongs to that class of calculating machines in which the product is not obtained by successive additions but in which the final result is arrived at directly.

The invention consists essentially in so constructing the machine that the displacement or rotation of a mechanism, which is actuated in a known manner by means of levers moved proportionately to the product of two set numbers, is taken up in tens and units and transmitted to a tens and units counter.

By arranging in juxtaposition, several elements of the kind just mentioned, with their counting mechanism and interposing between the different elements 10 to 1 gearing a complete calculating machine is produced for multiplying composite numbers together directly.

In order to explain the machine systematically I will first of all describe a simple machine made according to the principle of the invention with the aid of diagrammatic figures.

Figure 5:
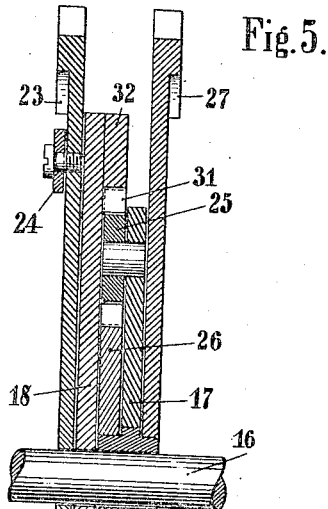
Figure 6:
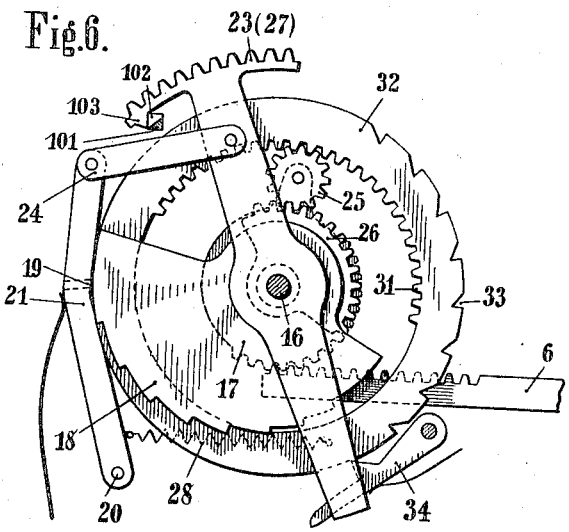
Figure 14:
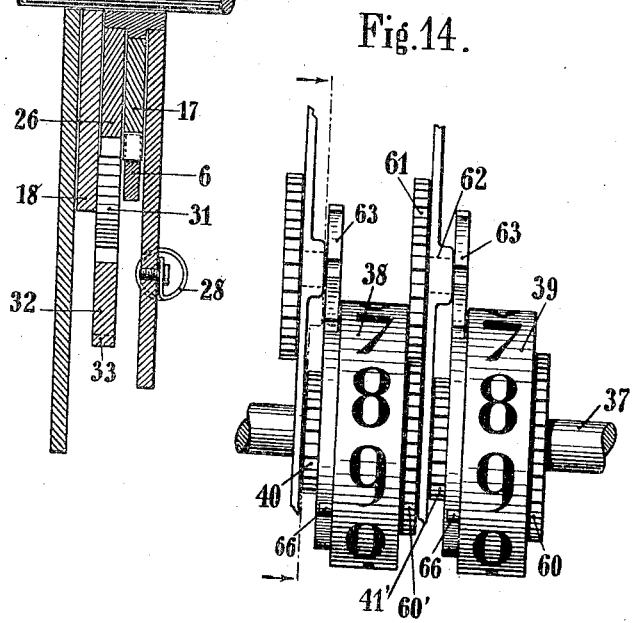
Figure 15:
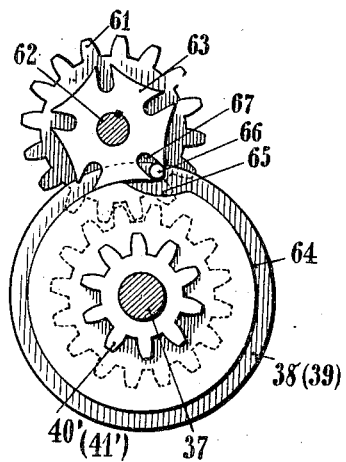
Figure 16:
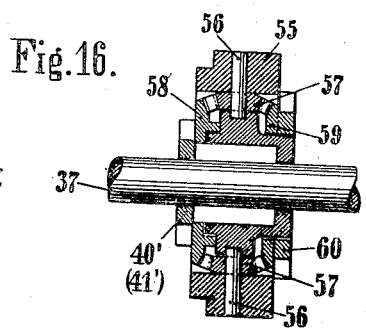
Figure 9:
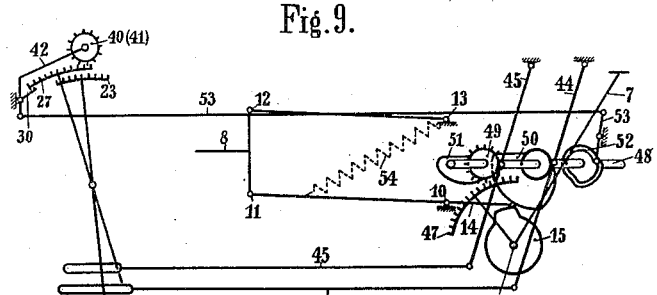
Figure 10:
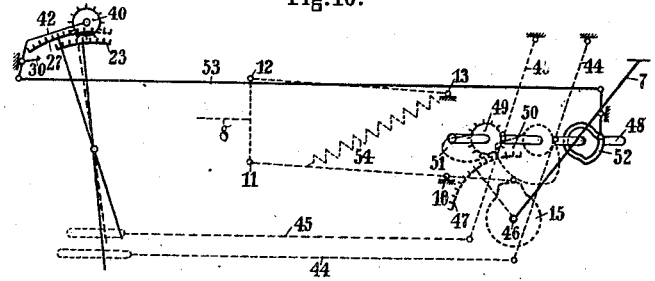
Figure 11:
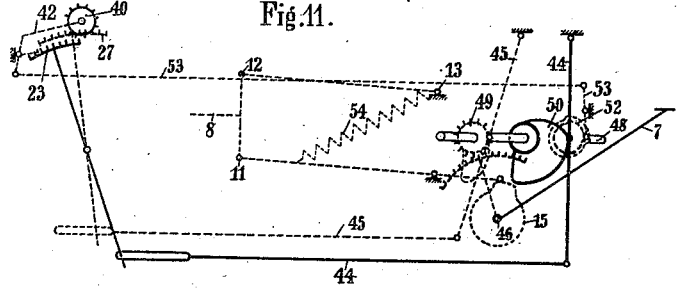
Figure 12:
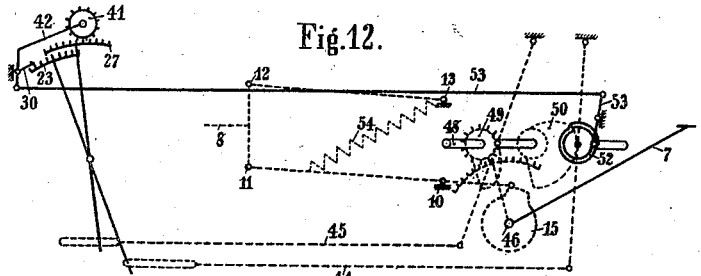
Figure 13:
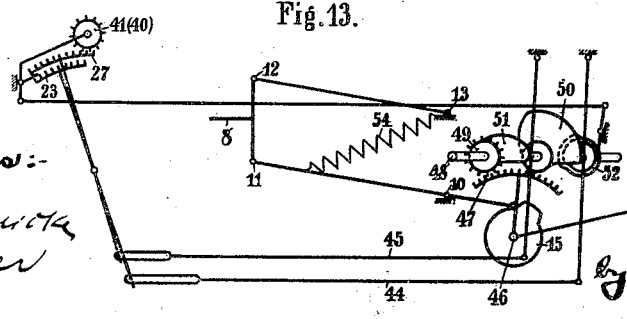
Figure 19:
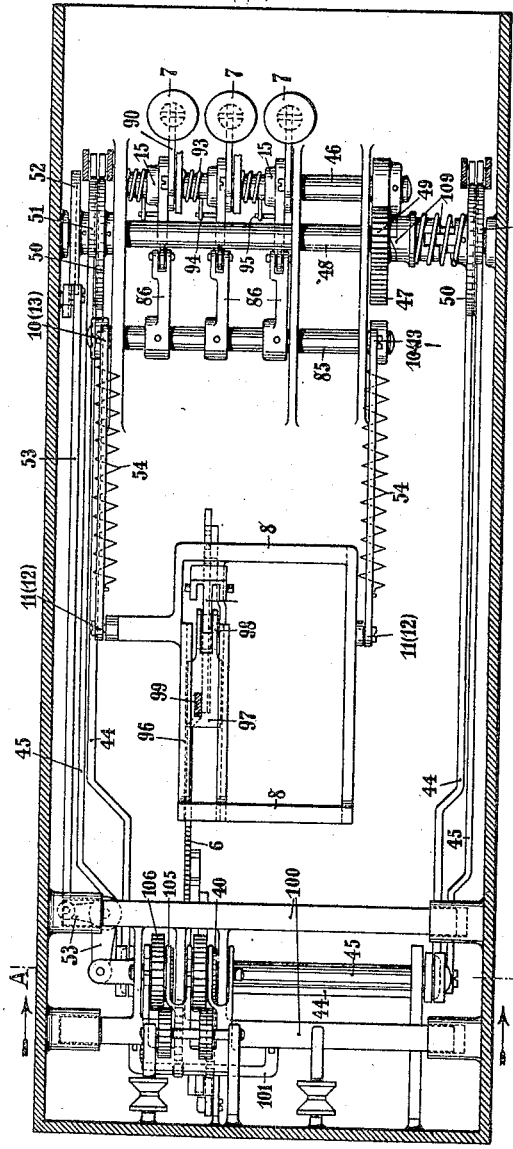
Figure 23:
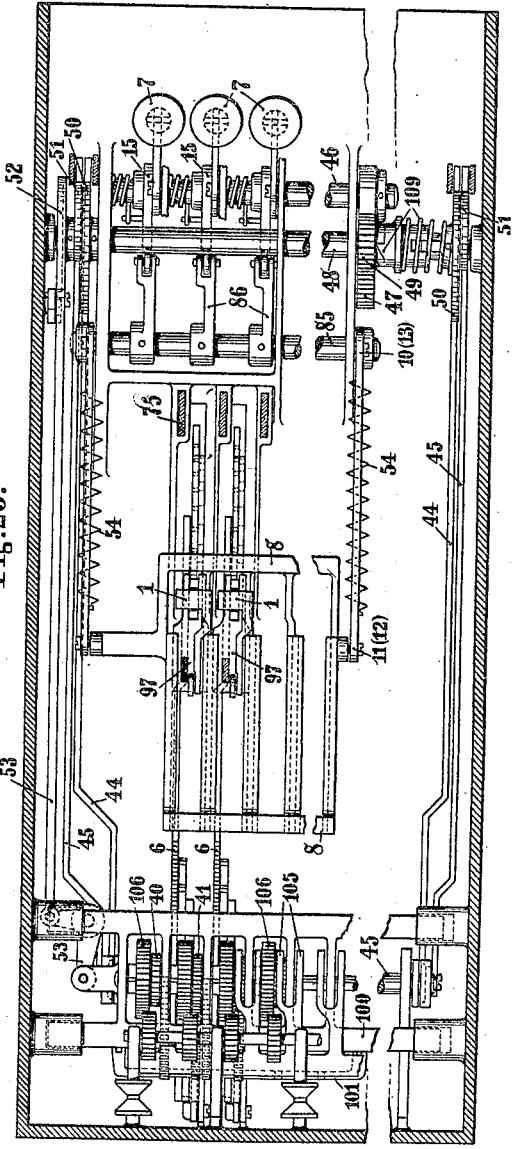
Figure 20:
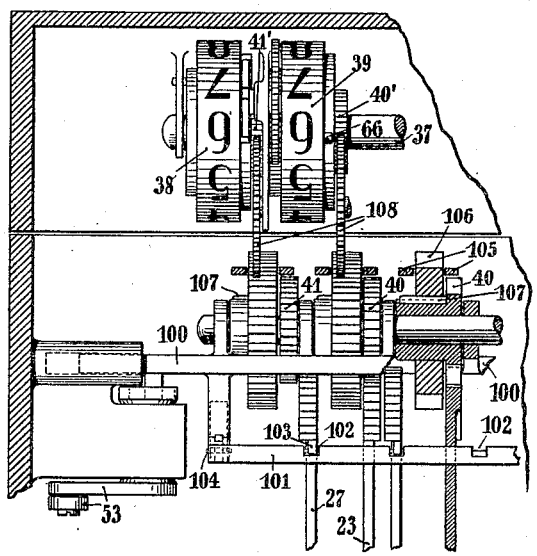
Figure 21:
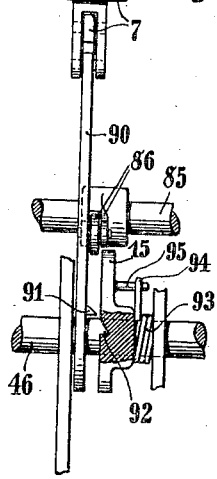
Figure 22:
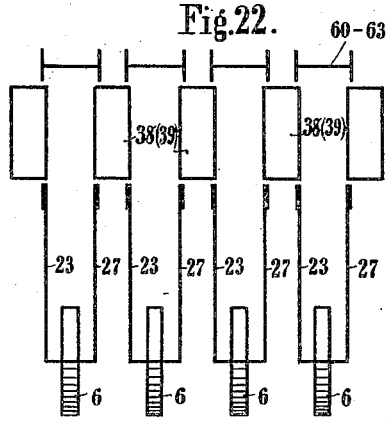

In Figures 1 and 1ª of the drawings is represented diagrammatically the known principle of moving or turning a mechanism through a distance equal to the product of two given numbers. Fig. 2 is a diagrammatic view of a mechanism comprising a rod provided with a rack the actuation of which according to the principle illustrated at Fig. 1 is effected by two keys. Fig. 3 shows diagrammatically the mechanism for taking up the number of tens from the rack after it has been moved. Fig. 4 is the corresponding mechanism for taking up the units. Fig. 5 shows in cross section and by way of example only a combined mechanism located on one axle and constructed according to the principle of Figs. 3 and 4. Fig. 6 shows a front elevation of the same mechanism. Figs. 7 and 8 show diagrammatically the method of transmitting the reading corresponding to the positions of the mechanisms shown at Figs. 3 and 4 to the tens and units counting wheels, while in Figs. 9 to 13 are shown diagrammatically five different positions of the mechanisms for communicating movements to the counting wheels from the multiplier keys an arrangement being selected wherein the tens and units sectors and their corresponding gear wheels are on the same axles instead of being placed side by side. Fig. 14 is a front elevation of the tens carrying mechanism for the counters. Fig. 15 is a side elevation of the tens carrying mechanism as shown in the preceding figure. Fig. 16 is a detail sectional view of one of the counting wheels or disks. Fig. 17 represents a longitudinal section of a complete machine constructed in accordance with one embodiment of the invention. Fig. 18 also represents a longitudinal section of the machine taken in a plane parallel to the plane of the section represented by Fig. 17 and showing the zero key in depressed position. Fig. 19 represents a sectional plane of the machine as shown in Figs. 17 and 18. Fig. 20 represents in detail and on an enlarged scale a section of the counting mechanism on the line A—B of Fig. 19. Fig. 21 is a detail view of the clutch for operatively connecting each multiplier key to its shaft. Fig. 22 is a diagrammatic view and Fig. 23 is a sectional plan view of a compound machine constructed in accordance with my invention. Fig. 24 represents a section of the machine showing another method of setting the swinging arm and also the units counter, and Figs. 25 and 26 are details of a modified mechanism for setting the parallel link motion.

Similar parts are represented by the same reference characters in the several views.

Suppose according to Figs. 1 or 1ª that an abscissa $a$ is divided into nine units of length and the ordinate $o$ into ten units.

Now draw a radius vector $r^9$ from the zero point on the ordinate to the division 9 on the abscissa and then a line through the point of division 4 on the ordinate parallel to the abscissa; then the length cut off between the radius vector $r^9$ and the ordinate $o$ of this parallel line, which length is denoted by $x_9^4$ (by similar triangles) $=9\times4:10$ that is to say it is proportional to the product of the numbers 9 and 4. Similarly the length $x_9^7$ between the division point 7 on the ordinate and the radius vector$=7\times9:10$ that is it is proportional to the product of 7 and 9 and so on. If any other radius vector is drawn between the zero point on the ordinate and a point of division on the abscissa, for instance to the point of division marked 6 and if again there be drawn a line through a point of division on the ordinate parallel to the abscissa and intersecting the radius vector $r^6$, then the length of this line between the radius vector $r^6$ and the ordinate $=6\times2:10$, that is it is proportional to the product of the numbers 6 and 2, and so on. If now it is desired to represent the product of two integers by a length, that is by the movement or turning of a point through a corresponding distance it is only necessary to provide an arm which can be turned around a zero point for instance by means of a key which corresponds to one of the numbers that is the multiplicand and to so set it that its direction produced to the abscissa (see the diagram at Fig. 1) cuts such abscissa at the corresponding point while by means of a second key (the multiplier key) a point is moved along the arm which has been thus set until the parallel to the abscissa reaches the point of intersection on the ordinate corresponding to the multiplier.

Fig. 2 of the drawings shows a diagrammatic view of a mechanism which effects the movement of a toothed rod or rack through a distance corresponding to the product of two integers according to the principle of Fig. 1. This mechanism consists of a lever 1 pivoted so as to turn about a fixed point $o$, the zero point on the ordinate. This lever 1 which corresponds to the radius vector $r$ of Fig. 1 is capable of being set, for instance by the intervention of an arm 3 and a lever 4, in the ten possible positions of the radius vector $r$ (according to Fig. 1) by means of keys 2, which correspond to the figures 0 and 9, and in such a way that by means of the key bearing the numeral 0 it can be brought into a position where it points vertically downward and coincides with the ordinate $o$ (Fig. 1). Again by actuating the key bearing the figure 6 it is brought into the position of the radius vector $r^6$ Fig. 1, and by means of the key bearing the figure 9, it is brought into the position of the radius vector $r^9$ Fig. 1. Along this lever 1 works a sliding piece 5 which has connected to it a racked rod 6. The movement of the slide 5 through a distance corresponding to the value of the multiplier is effected by means of a system of multiplier keys 7 located side by side. The sliding piece 5 which can be shifted along the lever 1 is itself mounted so that it can be moved on an arm or frame 8 which is fixed to a link rod 9 forming a part of a parallelogram link motion 10, 11, 12, 13 constructed so as to swing around the pivotal points 10 and 13. The movement of the link motion 10 to 13 from the zero position (the position in full lines) into the position corresponding to the amount of the multiplier (the dotted position) is effected by means of a prolongation 14 of the side 10—11, of the linkwork which rests against a cam disk 15. This cam disk 15 is turned by means of a multiplier key 7 from the position shown in full lines to that shown in dotted lines. By arranging ten multiplier keys 7 corresponding to the numerals 0 to 9 side by side each of such keys being coupled to a specially formed cam 15 it is possible to set the linkwork 10—13 in ten different positions corresponding to the ten points of intersection 0—9 of the ordinate $o$ Fig. 1. The movement of the sliding piece 5 and of the toothed rod 6 attached thereto which on the one hand is influenced by the movement of the lever 1 and on the other hand is dependent upon the movement of the linkwork 10—13, represents therefore the value of the product of the two numbers the keys of which have been depressed.

In Fig. 3 is shown diagrammatically the mechanism which gears with the units teeth on the toothed rack 6 in order to transmit its movement to the counting wheels. This mechanism consists of a toothed sector 17 mounted on a spindle 16 which engages with the rack 6 and which is turned through a distance corresponding to the movement of the rack 6. With this sector 17 is connected a stepped disk 18 in a manner to be hereinafter more fully described. This disk has 9 steps corresponding in value to the tens positions of the units wheel. Against a step of the stepped disk 18 is pressed, by means of a spring, the nose 19 of a lever 21 turning on a pivot 20 in such a way, that this lever when the stepped disk 18 is turned, moves inward through as many steps as have passed by the nose. This movement of the lever 21 is now communicated by means of a link 24 to a toothed segment 23 turning about an axis 22. The movement of the toothed segment 23 is consequently proportional to the number of steps on the stepped disk 18 which have passed over the nose 19 of the lever 21, that is to say, that it is also proportional to the movement of the rack 6 corresponding to the number of tens. From the toothed segment 23 the counting disk of the counting mechanism is actuated in a manner hereinafter described.

The mechanisms for taking up the units represented by the movement of the rack 6 is shown diagrammatically in Fig. 4. This mechanism is suitably mounted on the same axle as the mechanism of Fig. 3. It comprises a planet pinion 25 mounted on an arm of the toothed sector 17 gearing with an internally toothed annulus 31 attached to a ring 32 which turns freely with the stepped disk 18. On the other hand this planet pinion 25 meshes with a toothed sector 26 which turns around a spindle 16. This in turn is rigidly connected to a toothed sector 27 for recording the units. The toothed sector 27, under the influence of a spring 28 always tends to set itself in the extreme position in the direction of the arrow 29 but is prevented, when in engagement with a pawl 30 from doing so. By the movement of the toothed sector 17, when actuated by the rack 6 the planet pinion 25 rolls around the sector 26 which is locked in position and takes with it the freely movable ring 32 by reason of its interior teeth 31 and with it the stepped disk 18 to which it is coupled through a corresponding distance. The ring 32 has on its outer cylindrical surface notches 33 in which engages a spring pawl 34. When the ring 32 is turned through a distance corresponding to the movement of the rack 6, then as many entire notches 33 pass the pawl 34 as correspond to the movement of the number of tens and besides this such a fraction of a tooth as corresponds to the movement of the rack 6 through the units. If now after the setting of the rack 6 the pawl 30 is released then under the action of the spring 28 the toothed segment 27 turns in the direction of the arrow 29 and consequently the sector 26 turns in the same direction about the axis 16 and the planet pinion 25 which is on the arm of the now locked sector 17, turns through the corresponding amount and the ring 32 on account of the engagement of its inner teeth 31 with the pinion 25 turns back until the locking pawl 34 engages in the last passed recess 33 which now returns. The amount of reverse motion of the ring 32 and with it the adjustment of the toothed sector 27 corresponds consequently to the number of units through which the rack 6 has been pushed.

In Figs. 5 and 6 is shown a mechanism constructed according to the principle of Figs. 3 and 4 and differing therefrom only in this, that the axes 16 and 22 are coincident, whereas according to Fig. 3 for the sake of clearness are shown separated in the diagram. This arrangement allows for a corresponding shortening of the link 24, without difficulty.

In Figs. 5 and 6 after the manner set out in the diagrammatic view, 18 is the stepped disk from which the setting of the toothed segment 23 is effected by means of lever transmission gear 21 and 24 and this segment 23 is fixed to the movable ring 32. With the inner toothed annulus 31 of this ring engages the planet pinion 25 which is carried by the arm of the toothed sector 17 which latter is actuated by the rack 6. On the other hand the planet pinion 25 engages with the toothed sector 26 which in turn is coupled with the units segment 27 which is controlled by the spring 28.

With regard to the transmission to the counting mechanism of the values represented by the positions of the tens and units sectors 23 and 27, in Figs. 7 and 8 is shown diagrammatically and with the tens segment 23 and the units segment 27 placed side by side, the method of transmitting the setting to the counter with the mechanism in two different positions. This transmission is effected by restoring the segments from their set positions to their original positions and in a manner similar to the setting of the segments, this being effected not in one operation but in successive operations. These remarks have been made with reference to the conditions to be considered later in connection with the construction of a compound machine. With the mechanism set in the position shown on the diagram in Fig. 7 the segment 23 is at the fourth graduation while the segment 27 is held by the pawl 30 in position. The counting mechanism consists of counting disks 38 and 39 mounted on an axle 37 side by side one coming behind the other in Figs. 7 and 8. Of these the tens disk 38 is actuated by a toothed wheel 40 and the units disk 39 by a toothed wheel 41 with intermediate toothed wheels. The toothed wheels 40 and 41 are mounted in a rocking frame 42 in such a way that the wheel 40 can be brought into engagement with the segment 23 and 41 with the segment 27. The rocking frame 42 is also provided with an arm 43 which, when the frame is rocked over in such a way that the toothed wheel 40 engages with the segment 23 releases the catch 30. The toothed segments 23 and 27 can be restored from the set position to the original position by the pull of the rods 44 and 45. Supposing the tens segment 23 to be set according to Fig. 7 by the transmission of a movement from the depressed multiplier keys, which is effected in the manner hereinafter to be described, to the frame 42 in such a way that the toothed wheel 40 meshes with the segment 23 and thereupon at the same time the catch 30 is disengaged so that the toothed segment 27 under the action of the spring 28 sets itself into the units position. After this by means of the rod 44 the toothed segment 23 is restored to its original position and thereby the tens counting wheel 38 is turned by means of the toothed wheel 40 into the position shown in Fig. 8. After this movement is completed the rocking frame 42 is again brought into the position shown in Fig. 7, so that the toothed wheel 41 meshes with the segment 27 which has in the meantime been set, whereupon by means of the pulling rod 45 this segment is brought into its original position and so the toothed wheel 41 and the counting mechanism 39 is turned through the number of corresponding units. From what has now been explained it will be seen how by actuating two keys, one representing the multiplier and the other the multiplicand, the product of the numbers represented by the two keys is obtained directly, without the necessity of repeated additions, and transmitted to the counter.

In Figs. 9 to 13 is indicated, in five different positions the method of controlling from the multiplier keys the settings of the mechanism shown in Figs. 7 and 8. In these arrangements however the tens and units segments 23 and 27 and their transmission wheels 40 and 41 are on the same axes, respectively. By depressing one of the multiplier keys 7 the corresponding cam disk 15 and the linkwork 10 to 13 are actuated in the manner above described. At the same time through the depression of the keys, the spindle 46 on which the cam disks 15 are mounted is rotated and with it a toothed sector 47. This engages in turn with a toothed wheel 49 mounted on a spindle 48. The relation of the gearing of the toothed sector 47 and the toothed wheel 49 is such that when one of the multiplier keys 7 is fully depressed one complete rotation of the spindle 48 is effected. On the spindle 48 are mounted side by side a cam disk 50 for actuating the pulling mechanism 44, a cam disk 51 for actuating the pulling mechanism 45, and a grooved cam disk 52 for actuating a lever and rod mechanism 53 which in turn controls both the pawl 30 and the rocking frame 42. In the position shown in Fig. 9 the multiplier key 7 has been depressed through one sixth of its path of travel and by this movement the setting of the linkwork 10 to 13 and consequently of the tens segment 23 have been effected while the units segment, the rocking frame 42 and the toothed wheels 40 and 41 are still in their original positions. In the position shown in Fig. 10 the multiplier key 7 has been depressed through another sixth of its whole path of travel and by this movement the pawl 30 has been disengaged, through the intervention of the mechanism 53 which has been set in motion by the grooved cam 52. The result is that the units segment sets itself automatically as above described. Moreover the rocking frame 42 has been rocked over at the same time by the mechanism 53, so that the toothed wheel 40 is now in engagement with the tens segment 23 while the pulling mechanisms 44 and 45 are still inactive. In the position of the parts shown in Fig. 11 in which the multiplier key 7 has been depressed through a third sixth of its whole path of travel without the positions of the other portions of the mechanism being altered the pulling mechanism 44 is brought back by the cam disk 50 whereby the tens segments 23 is turned back into its original position and consequently the wheel 40 turned through a corresponding amount. In the position shown in Fig. 12, where the multiplier key 7 has been depressed throughout a fourth sixth of its entire path of travel the pulling mechanism 53 is brought back to its original position by means of the grooved cam 52, setting the pawl 30 and the rocking frame 42 in their original positions, the result being that the toothed wheel 41 again meshes with the units segment 27 the other positions of the mechanisms remaining unaffected. In the position shown in Fig. 13, where the multiplier key 7 has been depressed through a fifth sixth of its path of travel, the pulling mechanism 45 has been actuated by the cam disk 51 whereby the units segment 27 has been brought back to its original position giving a simultaneous rotation to the toothed wheel 41, while by means of the disk 15 the linkwork 10 to 13 is raised into its original position under the influence of a spring 54 which has been put in tension by the previous downward movement of the frame. By the depression of the multiplier key 7 through the last sixth of its path of travel, the pulling mechanisms 44 and 45, the cam disks 50 and 51 and the grooved cam disk 52 are brought back to their positions shown in Fig. 9, while the other parts of the mechanism which have already returned to their initial position remain unaffected. At the same time by means of a shifting gear provided for the purpose and hereinafter described, the counting mechanism can be shifted through one space. When the multiplier key 7 is released it springs back into the original position causing the cam 15 to return through the intervention of the side acting coupling mechanism hereinafter described.

We now come to the method of carrying over the tens. As when repeated multiplications are carried out the total result must appear on the counter, for instance $3 \times 9$ plus $6 \times 6 = 27$ plus $36 = 63$ according to which the units disk has to be turned through 13 units there must be a method of carrying the tens between two neighboring counting wheels, that is between the units and tens disk and this carrying over of the tens must be absolutely independent of the mechanisms of Figs. 3 and 4 and only connected with the counter itself. This mechanism for the carrying over of the tens, the principle of which is known and is effected by differential gearing in the counting mechanism is shown in Figs. 14, 15 and 16.

The counting mechanism consists of a tens counting wheel 38 and a units counting wheel 39 located on the same axle. Each of these counting wheels is similarly constructed and consists of a ring 55 on the cylindrical surface of which the figures 0 to 9 are placed. These rings are actuated from the tens or units segments 23 or 27 by a toothed wheel $40^1$ or $41^1$ (Figs. 7 and 16) in the following manner. In the ring 55 are mounted bevel wheels 57 turning on axles 56 and these are in engagement with bevel wheels 58 and 59 turning on the axle 37 of the counting mechanism (see Figs. 7 and 16). The bevel wheel 58 is rigidly connected with the toothed wheel $40^1$ and the bevel wheel 59 with a toothed wheel 60. If now the toothed wheel $40^1$ or $41^1$ is turned by a segment 23 or 27, the bevel wheel 58 turns with it whereupon the bevel wheels 57 roll around on the fixed bevel wheel 59 which latter is attached to the toothed wheel 60, so that the ring 55 on the surface of which are the numbers is moved to a corresponding extent. The toothed wheel 60 is in turn in engagement with a toothed wheel 61 to the axis 62 of which is keyed a five pointed cross 63 which is actuated from the previous counting disk. The cross 63 is held by the projecting edge 64 of the next counting disk until a cut away portion 65 of the edge passes by the cross by which it is freed, thereupon a pin 66 fixed in the neighborhood of the cut away portion engages one of the slots 67 of the cross and turns it through one division. The toothed wheel 61 and with it the toothed wheel 60 of the next counting disk is turned then through a corresponding amount. This turning is again transmitted through the bevel wheel 59 and the bevel wheels 57 to the ring 55, which ring is again turned further through a division of one number corresponding to the movement of the cross and in this way the ten to one movement from the previous counting disk to the following one is effected. The pin 66 which controls the cross is located at that portion of the ring 55 at which the figure 9 appears, so that each time the 9 passes, the next following disk is pushed forward through one division. By this arrangement the carrying over of the tens is effected in the counting mechanism independently of the setting mechanism.

We now come to consider the complete simple machine. In Figs. 17 to 21, is shown a simple machine built on the lines of the foregoing principles, wherein 68 is the framework on which are arranged, in a row one behind the other, the multiplicand keys 2 which correspond to the figures 0 to 9 in the manner well known in machines for performing addition. These keys are controlled by springs and move vertically. 4 is a curved lever which is pivoted at 69, the forward end 70 of which presses upon a roller on the arm 3 of the lever 1 which lever turns about the point $o$. The keys when depressed actuate the lever in such a way that the setting, corresponding to the diagrammatic views Figs. 1 and 2, is effected. In order to lock the lever 1 in its position after the setting has been effected, a stepped sector 71 is provided at the lower end of such lever and against the steps of this sector takes the locking arm 73 pivoted at 72. The corresponding turning of the locking arm 73 is effected by means of a sliding piece 75 which is controlled by a spring and provided with a diagonal slot 74. This sliding piece is controlled by a lever 77, pivoted at 76. This allows for the lever 77 being turned to an extent corresponding to the depression of the end 70 of the curved lever 4 and corresponding exactly to the setting of the lever 1. In order to prevent the lever 1 swinging out toward the left when it is being set a sector 79 is provided by the side of the stepped sector 71, which sector 79 is provided with locking slots 78 in which a locking piece 81 controlled by a spring 80 engages. Therefore when a multiplicand key is depressed the lever 1 is locked until unlocking is effected for instance by the depression of another multiplicand key.

From the drawing (Fig. 17) it will be seen that the ninth multiplicand key has no influence upon the bent lever 4 and therefore does not move the said lever. In the normal state the lever 1 is in the position corresponding with the position of the radius vector $r^9$ in the diagram. On the other hand as will be seen from Fig. 18 by depressing the zero key the lever 1 is swung to the greatest possible extent to the right and comes into a position pointing vertically downward. In order to bring back the multiplicand key which has been depressed by the action of depressing another key, the keys are provided in a well known manner with locking noses 82 which engage with corresponding slits in a plate 84 which is controlled by a spring 83 so that when a key is depressed, the locking plate 84 is pushed toward the right and if a key has been previously depressed it is unlocked and released.

At the front end of the framework 68 of the machine are the multiplier keys 7 arranged side by side, see Figs. 17 to 19. Each of these multiplier keys is connected with the corresponding cam disk 15 by a one direction coupling, see Fig. 21. The actuation of the parallelogram linkwork 10 to 13 (Fig. 2) is effected by the cam disk 15 and the linkwork in the method of construction shown in Fig. 19 is formed as a frame and swings with a spindle 85. To this spindle are keyed arms 86 (corresponding to the arm 14 Fig. 2). These arms 86 are furnished with rollers which bear upon the cam disks 15, so that when one of these cam disks swings upward, the corresponding arm 86 is pushed through a distance corresponding to the displacement of the cam, consequently the linkwork 10 to 13 is pushed downward through a corresponding distance in the manner already described. The cam disks 15 can turn freely on the spindle 46 (see Fig. 21) but the multiplier keys 7 are so coupled to the spindle 46 by a spring pawl 87 (Fig. 17) that when one of these keys is depressed the spindle 46 is caused to turn while the other keys are unaffected. When the key which has been depressed is released it springs up again into its original position under the influence of the spring 88.

In order to keep the multiplier keys 7 in a vertical position when they are depressed they are carried by means of parallel linkwork 89 and 90. The coupling between a cam disk 15 and the corresponding multiplier key 7 is effected, as shown in Fig. 21. It will be seen that there is a projecting nose 91 on the bar 90 of the linkwork of the multiplier key 7 which takes into a notch 92 cut in the cam 15, which cam is pressed by means of a spiral spring 93 against a member 90 of the linkwork. Consequently when the key 7 is depressed the cam disk 15 is carried around by means of the projecting nose 91. When the key 7 returns under the influence of its spring 88 the nose 91 is disengaged from the notch 92 and causes the cam 15 to move toward the right (see Fig. 21) thus causing it to move clear of the corresponding arm 86 of the linkwork 10 to 13, so that the cam disk 15 returns to its original position under the influence of the spring 93 which has been put in tension by the previous rotation of the cam disk. The end 94 of the spring rests against a pin 95 on the side of the cam disk 15. When the cam disk 15 has turned back, the notch 92 comes opposite to the nose 91 and under the influence of the spring 93 it is moved axially into reëngagement, whereupon the parts return to their original position. It will be seen that by this arrangement each of the multiplier keys can be depressed independently of the others and can return to its original position and that at the same time the corresponding cam disk 15 is actuated without actuating the other cam disks, while by the simultaneous turning of the spindle 46 other operations are effected.

To the front vertical member 11—12 of the linkwork 10 to 13 is attached a frame 8 (see Figs. 2 and 19) provided with guideways 96 in which works a slide 97 the front end 98 of which is forked and slides along the lever 1. The slide 97 moves when the frame 8 is depressed with the frame and between the guideways 96 and along the lever 1 to an extent corresponding on the one hand to the lowering of the frame 8 and on the other hand to the extent to which the lever 1 swings. The slide 97 is provided with a slot through which passes an arm 99 so that it slides freely with respect to the slide in the vertical direction but must move therewith in the horizontal direction. This arm 99 is connected to the rack 6 and hence the rack receives all the horizontal movements of the slide 97 but not the vertical ones. From the rack 6 by means of the constructions shown in Figs. 5 and 6 is effected the actuation of the tens segment 23 and the units segment 27 which are mounted on a transverse axle 16. The conversion into a reading on to the counting mechanism 38 and 39 through the toothed wheels 40 and 41 of the positions of the tens and units segments is effected in practice in the machine represented in Figs. 17 to 20 not by rocking these toothed wheels and the pawl 30 but by a side movement across the machine, because this construction is more simple and the arrangement of the machine as a compound machine, as will be explained further is also materially simplified. The toothed wheels 40 and 41 which are intended to engage with the segments 23 and 27 for transmitting the movements of the segments to the counting mechanism are carried in a frame 100 which can be moved transversely with respect to the machine and the pawl 30 is also attached to this frame 100. This catch 30 now takes the form of a rod 101 with notches 102 while the segment 27 is provided at the rear end with a nose 103 which normally rests against the rod 101 but as soon as the rod 101 comes into a position in which a notch 102 coincides with the nose, it, the nose, slips through the notch and the units segment 27 is unlocked and can take up its position freely. The rod 101 is mounted in bearings 104 in the frame 100 and it has a slight downward spring (see Figs. 17 and 20). The transverse movement of the frame 100 is effected by means of the grooved cam 52 and the pulling mechanism 53 in a manner analogous to that described with reference to Figs. 9 to 12 when explaining the principle. Between the toothed wheels 40 and 41 and the counting wheels 38 and 39 intermediate gear wheels are provided. The counting wheels 38 and 39 are of the form shown in Figs. 14 to 16 that is provided with differential mechanism for automatically carrying over the tens. The construction differs from that represented diagrammatically in Figs. 7 and 8 where the transmission was direct, in the use of the intermediate gearing. The reason is that this facilitates the construction and enables the counting mechanism to be differently located and placed above the machine. The toothed wheels 40 and 41 are located in the frame 100 and move therewith. 105 are forks and 106 are toothed wheels which cannot slide axially but are held in position by the forks 105. The hubs of the wheels 40 and 41 can slide into the naves of the wheels 106 and the wheels 106 are connected to the hubs of the wheels 40 and 41 by keys 107, so that the motion of the toothed wheels 40 and 41 is first transmitted to the toothed wheels 106 and from them by the intermediate wheels 108 to the toothed wheels $40^1$ and $41^1$ of the counting disks 38 and 39. The position of the counting wheels shown in Fig. 20, of the units and tens segments 27 and 23 and of the toothed wheels 40 and 41 corresponds to the positions shown in the diagrammatic view in Fig. 10 where the toothed wheel 40 is in engagement with the toothed segment 23 while the catch 30 is out of engagement, so that the units segment is free to set itself. As will be seen from Fig. 20, the frame 100 is brought into such a position that the toothed wheel 40 is in engagement with the segment 23 while at the same time the rod 101 has been brought into such a position that the notch 102 is opposite the nose 103 on the segment 27 allowing the nose to pass freely through such notch. The return of the units segment 27 to its initial position is rendered possible after the rod 101 and the frame 100 have been returned to their original position even though the notch 102 is now coincident with the nose 103 because the rod 101 is attached to the frame 100 by being mounted in bearings 104 with respect to which it can spring vertically downward.

The pulling mechanisms 44 and 45 are located at the sides of the framework of the machine and placed symmetrically with respect thereto. When the spindle 46 is turned back under the influence of a spring, carrying with it the segment 47 which is keyed thereto, in order to prevent the spindle 48 on which the cam disks 50 and 51 and the grooved disk 52 are keyed from turning back, the toothed wheel 49 is not rigidly connected to the shaft 48 but is connected thereto by means of a one way clutch 109 which is constructed in a similar manner to the coupling clutch between the cam disks 15 and the multiplier keys 7. The operation of the machine which was set out clearly as above with reference to the diagrammatic drawings, may be summed up as follows:— By depressing the multiplicand key, the lever 1 alone is set in position. Next by pressing down one of the multiplier keys the following operations take place in succession. The rack 6 is actuated, then the tens and units segments, then the counting disks 38 and 39 are brought into position and finally when the key is fully depressed, the working parts are brought back to their original positions, while when the depressed multiplier key is released, it, and the corresponding cam coupled to it, return to their original positions without influencing any other parts of the controlling mechanisms. We now come to the consideration of the compound machine. It differs only in this respect, that in place of being provided with one row of multiplicand keys and one lever 1 controlled thereby, several rows of multiplicand keys 2 are provided and a corresponding number of levers 1. On the other hand there is but one single row of multiplier keys arranged along the front of the machine, as in the case of the simple machine, and only a single linkwork 10 to 13 in guides in which work a number of slides 97 each of which corresponds to a lever 1.

In Fig. 22, which shows a diagrammatic view of the compound machine, 6 shows the racks from which the tens segments 23 and the units segments 27 are operated. As the units in each successive place are equal in value to the tens in the preceding place, it follows that in the case of the compound machine, the units segment of each set must be located, so as to engage with the tens segment of the next set. This is indicated diagrammatically in Fig. 22. This construction is possible with the mechanisms already described, as will be realized from the fact that the transmission of the reading from the units segment 27 to the counting mechanism, only takes place after the transmission of the reading from the tens segment 23 to the counting mechanism, is complete and further from the fact that the carrying of the tens (by mechanisms 60—63) is not effected through the setting mechanism, but by the counting mechanism, by reason of the fact that each individual counting wheel is provided with differential mechanism, as explained with reference to Figs. 14 to 16.

In Fig. 23, the compound machine is shown in plan with the counter removed. This machine only differs from the simple machine, in that, instead of one lever 1 being provided, several of such levers are provided corresponding with the number of numerical places shown on the machine. Instead of one slide 97, there are several and as many racks 6, as also a corresponding number of controlling mechanisms. The actuation of the levers 1 by the multiplicand keys; and of the linkwork 10 to 13 and the racks 6 by the multiplier keys 7, as well as the mechanisms for setting the units and tens segments and for the counting wheels differ in no other respects from these arrangements in the simple machine.

It may be remarked, that as mentioned above, the shifting of a slide carrying the counter, one place to the right or left according to whether multiplication or division is to be effected, where such multiplication or division is required with numbers of more than one numerical place, can be effected automatically by means of a multiplier key when it is not desired to effect it by hand. Supposing, for instance it is required to multiply 875 as a multiplicand by 93 as a multiplier. First of all, the multiplicand is set. Then the multiplier key bearing the number 3 is depressed, multiplying the number 875 by 3 and with the multiplier key in the fully depressed position, the slide carrying the counter, is shifted one place to the right so that when the next multiplier key bearing the number 9 is depressed, the multiplication by 90 is effected and the result is automatically added to the multiplication by 3 in the counting mechanism. It follows that with this arrangement, by simply setting the multiplicand on the multiplicand keys and the multiplier on the multiplier keys, the result of the multiplication immediately appears on the counter. It follows further than the machine may be used also as an adding machine, since by depressing the multiplier key bearing the number 1 the multiplicand set on the multiplicand keys can be at once transferred to the counter and then a fresh multiplicand set on the multiplicand keys and transferred to the counter by depressing the multiplier key marked with the number 1 in which case it is simply added to the previous multiplicand.

With reference to Fig. 24, in this case the setting of the pivoted lever from the multiplicand keys 2, is effected by two curved levers 109 and 110 which are pivoted at 111 and 112 to the framework and connected together by linkwork 113 in such a way that the depression of one of the levers corresponds to a rise of the other lever through an equal angle. The multiplicand keys 2 have projections 114 working in slots in a cross frame of the casing. When one of the multiplicand keys is depressed the projection 114 pushes down one of the curved levers, say, the lever 110 which causes the lever 109 to rise until the projection 114 comes into contact with the rising lever 109, when locking takes place. In order that this locking may be effected even when the first multiplicand key is depressed (see Fig. 24) to which key the curved lever 110 does not extend, a fixed projection 115 is provided on the cross piece of the framework at the proper height, so that the multiplicand key 2 and the curved lever 109 can only descend until the lever 110 comes into contact with the projection 115. 118 is a bent lever pivoted at 117, and 116 is a link connected to the curved lever 109. One of the arms of the lever 118 is connected with the bent round arm 119 of the lever 1 and the other to the link 116, so that the lever 1 is turned to an extent corresponding to the rising and falling of the curved lever 109. Therefore according to which key is depressed, the lever 1 is caused to move from one position to the other, the difference from the first construction being that, in the former case, the lever was brought back to its original position by means of a spring. A further advantage of this method of controlling the lever is that, the locking arm 73, which was controlled from the multiplicand keys as well as the stepped sector 71 in connection with the lever 1 can be dispensed with.

Referring to Fig. 24, which shows another method of constructing the ring 32 for the units sector 27, in this case, instead of employing the method already explained of setting the ring by means of the spring 28, a pawl mechanism is employed for this purpose. To carry this into effect, the ring 32, for the units sector 27 is not constructed, as in the previous case, with recesses 33 into which a pawl 34 engages, thus limiting the turning of the ring, back under the influence of the spring 28, but in this case it is provided with teeth 120 into which a pawl 122 pivoted at 121 is caused to engage when its surface meets the surface of one of the teeth 120, brought into position by means of the movement of the rack 6. The movement of the pawl 122 is effected by a pushing rod 123. The end of this rod has a cross piece 124 engaging in a slot 125 which embraces the spindle 48 and there is a cam disk 126 keyed to the spindle 48, the surface of which is in contact with a roller 127 working on the cross piece 124.

Referring to Figs. 25 and 26, these show another method of controlling the linkwork 10 to 13 from the multiplier keys 7. It differs from the methods of construction already described, in this respect, that the actual setting of the linkwork is effected by a special handle, while the multiplier keys only control a sliding piece by the movement of which the amount of depression of the linkwork is regulated. In this construction a lever 128 is in connection with the arm 14 of the linkwork. This lever is provided with a roller 129 working on a cam disk 130 which can be turned by means of a handle 131. The other end 132 of the lever 128 is forked and embraces a pin 133 which is attached to a slide 134 which works in vertical guideways. This slide 134 is provided with a projection 135 which works in a slot 136 of a slide 137 located horizontally at the side of the vertically moving slide. The slot 136 of the horizontal slide 137 is cut with steps at its upper edge 138. According to the setting and horizontal displacement of the slide 137, the slide 134 can be raised to a greater or less extent, but only, in any case, until the pin or projection 135 of the slide 134 meets the corresponding step on the edge of the slot 136. After this there can be no further vertical rise of the slide 134 or of the end 132 of the lever 128 connected therewith. The setting of the horizontal slide 137 is effected from the multiplier keys 7 in the same manner as the setting of the lever 1 from the multiplicand keys 2, that is by the curved levers 139 and 140 which are connected together by means of a link 141, a bent arm 142 being provided on the curved lever 139, which arm is connected by a link 143 to the slide 137 and moves the same to an extent corresponding with the value of the figure shown on the multiplier key which has been depressed. The setting of the linkwork 10 to 13 therefore is effected, first by depressing the corresponding multiplier key and then, by turning the handle 131. The cam 130 then raises the lever 128 until the projection 135 comes against the corresponding step on the edge of the slot 138. On the operation of turning being continued, the arm 14 is first raised and thereby the linkwork 10 to 13 to a corresponding extent. The advantage of this arrangement of the linkwork, is, that the multiplier keys can be operated with a slight amount of pressure while the controlling operations can be effected from the controlling lever 131 with less trouble.

What I claim and desire to secure by Letters Patent of the United States of America is:—

1. In a calculating machine, the combination of counting mechanism, multiplicand and multiplier key mechanisms, a counter actuating member, a pivoted lever having means for setting it by the multiplicand key mechanism, and a part coöperative with and adjustable relatively to said lever, said part being operatively connected to the counter actuating member and having means for setting it from the multiplier key mechanism.

2. In a calculating machine, the combination of counting mechanism, an actuating member therefor, a setting lever coöperative with said member, a set of keys, and a curved element coöperative with said keys and operative to set said lever in different positions according to the particular key actuated.

3. In a calculating machine, the combination of counting mechanism, an actuating member therefor, multiplicand and multiplier key mechanisms, a setting lever, means for setting said lever from the multiplicand key mechanism, and a slide shiftable with respect to said lever and operatively connected to the counter actuating member, said slide having means for setting it from the multiplier key mechanism.

4. In a calculating machine, the combination of counting mechanism, an actuating member therefor, multiplicand and multiplier key mechanism, a pivoted setting lever having means for adjusting it from said multiplicand key mechanism, a slide shiftable relatively to said lever and operatively connected to the counter actuating member, and a parallel link-work controlled by the multiplier key mechanism and coöperative with said slide to shift it relatively to the setting lever.

5. In a calculating machine, the combination of counting mechanism, a reciprocatory actuating member therefor, multiplicand and multiplier key mechanisms, a pivoted setting lever having means for adjusting it from said multiplicand key mechanism, a slide shiftabl on said lever and having a connection w h said actuating member which permits ie slide to move transversely of the path of movement of said member, and means for setting said slide under the control of the multiplier key mechanism.

6. In a calculating machine, the combination of counting mechanism, an actuating mechanism therefor, multiplicand and multiplier keys corresponding to numerals of different values, a setting member operatively connected to and controlled by the multiplicand keys, a slide operatively connected to the counter actuating member and shiftable relatively to said setting member, and means for adjusting said slide by the different multiplier keys embodying a rack shaft having cams operative by the respective multiplier keys and having means for transmitting their motion to said slide.

7. In a calculating machine, the combination of counting mechanism, an actuating member therefor, multiplicand and multiplier keys, setting mechanism coöperative with the counter actuating member and controlled by the multiplicand keys, and means for controlling the setting mechanism from the multiplier keys comprising a set of cams for the respective multiplier keys, and clutches for automatically coupling the cams to such keys.

8. In a calculating machine, the combination of counting mechanism, an actuating member therefor, setting mechanism for the counter actuating member, a set of keys, a shaft pivotally supporting them, cams on said shaft individual to the respective keys and coöperative with the setting mechanism, and clutches for coupling each key to its respective cam when said key is actuated and for uncoupling such key when the latter is restored.

9. In a calculating machine, the combination of counting mechanism, an actuating member therefor, multiplicand and multiplier keys, setting mechanism operatively associated with the counter actuating member and means for controlling said setting mechanism from the multiplier keys embodying a shaft having the multiplier keys rotatably mounted thereon, cams on said shaft individual to the respective multiplier keys and coöperative with the setting mechanism, and a clutch for operatively connecting each cam to its respective multiplier key when the latter is actuated and for disconnecting such parts when the multiplier key is restored to normal position.

10. In a calculating machine, the combination of counting mechanism, a reciprocatory actuating member, key controlled means for actuating said member, a stepped disk operative by said actuating member, a toothed sector for operating the counting mechanism, and a lever coöperative with said toothed sector for controlling the extent of movement of said sector.

11. In a calculating machine, the combination of counting mechanism, a sector for operating the same, a stepped disk, key controlled means for actuating said disk, a lever coöperative with said disk for determining the extent of movement of the sector, a toothed ring connected to the stepped disk, a planet pinion operatively connecting said ring to said sector, said ring having locking teeth corresponding to the steps of said disk, and a pawl coöperative with the locking teeth of said ring.

12. In a calculating machine, the combination of counting mechanism, tens and units segments coöperative therewith, means for locking the units segment from movement, multiplier keys for actuating the tens segment, means controlled by each multiplier key for releasing the locking means for the units segment after the tens segment has been set.

13. In a calculating mechanism, the combination of counting mechanism, tens and units segments coöperative therewith, a catch for preventing operation of the units segment, key mechanism for setting the tens segment, and means operative automatically by each key when actuated, for releasing said catch and permitting operation of the units segment.

14. In a calculating machine, the combination of counting mechanism, key controlled mechanism for actuating the counting mechanism embodying tens and units segments, and means for relatively shifting the counting mechanism and segments whereby the units segment coöperates with the counting mechanism in one position and the tens segment coöperates therewith in another position.

15. In a calculating machine, the combination of counting mechanism, key controlled actuating mechanism therefor embodying units and tens segments, said mechanisms being relatively shiftable whereby the units and tens segments may be successively associated with the counting mechanism, and a catch for preventing operation of the units segment, said catch being controlled by the relative shifting movement of said mechanisms.

16. In a calculating machine, the combination of counting mechanism, key controlled actuating mechanism therefor embodying units and tens segments, such mechanisms being relatively shiftable to bring the units or tens segment into coöperative relation with the counting mechanism, and means for restoring said segments to normal position embodying a shaft, cams thereon, and means coöperative with said cams for resetting the tens segment to initial position and for relatively adjusting the counting mechanism and its actuating mechanism whereby the units segment is in coöperative relation therewith.

17. In a calculating machine, the combination of counting mechanism, actuating mechanism therefor, multiplicand and multiplier key for controlling the counter actuating mechanism, and means for restoring the counter actuating mechanism embodying a cam shaft having restoring devices coöperative with the counter actuating mechanism, and means connecting the cam shaft to the multiplier keys whereby a complete revolution in one direction is given the cam shaft when any one of the multiplier keys is depressed.

18. In a calculating machine, the combination of counting mechanism, actuating mechanism therefor, key controlled setting mechanism coöperative with the actuating mechanism, and key controlled means for moving the counting mechanism through one space when each key is depressed.

19. In a calculating machine, the combination of counting mechanism, actuating mechanism therefor, a setting member coöperative with the counter actuating mechanism, a set of multiplicand keys, and means for adjusting the setting member by said multiplicand keys comprising a pair of curved levers, and a link operatively connecting such levers whereby depression of one lever by one of said keys will cause a rising of the other lever.

20. In a calculating machine, the combination of counting mechanism, actuating means therefor, setting mechanism operatively associated with the counter actuating mechanism, multiplicand and multiplier keys mutually controlling the setting mechanism, and means operative by the multiplier keys for automatically restoring the counter actuating mechanism.

21. In a calculating machine, the combination of counting mechanism, actuating means therefor, setting mechanism coöperative with the counter actuating mechanism, multiplicand and multiplier keys controlling the setting mechanism, and means operative by the multiplier keys for restoring the counter actuating mechanism and for actuating the counting mechanism.

In testimony whereof, I affix my signature, in presence of two witnesses.

FRANZ RAUCHWETTER.

Witnesses:
   HENRY HASPER,
   WOLDEMAR HAUPT.

Copies of this patent may be obtained for five cents each, by addressing the "Commissioner of Patents. Washington, D. C."